July 3, 1951  F. KOENIG  2,558,965
FEELER GAUGE HOLDER
Filed Dec. 24, 1946
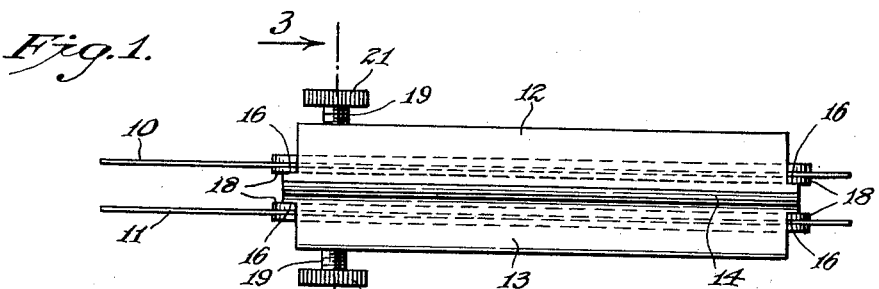
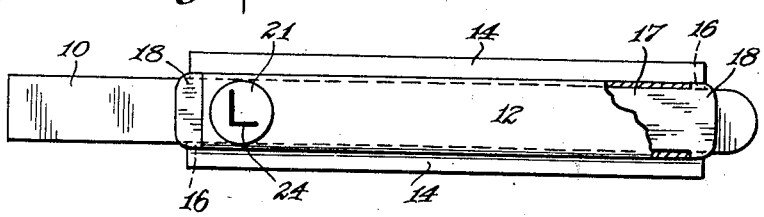
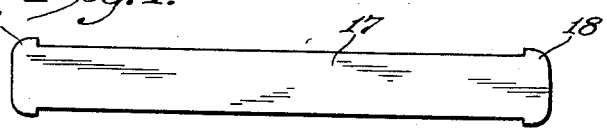
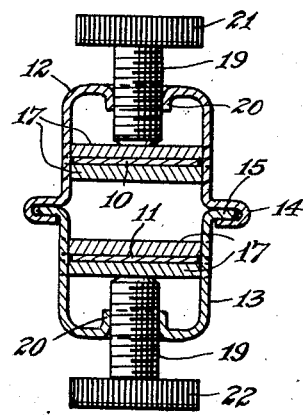
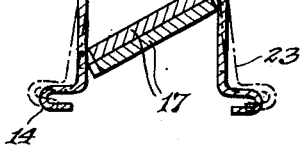
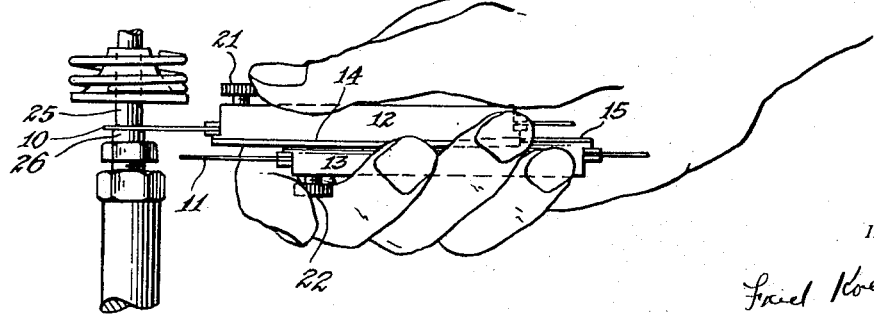
INVENTOR.
Fried Koenig Patented July 3, 1951

2,558,965

UNITED STATES PATENT OFFICE 2,558,965

FEELER GAUGE HOLDER

Fred Koenig, Tottenville, N. Y.

Application December 24, 1946, Serial No. 718,226

7 Claims. (Cl. 33—168)

This invention relates to a thickness or feeler gauge holder and has for an object to provide such a tool which is especially adapted for determining the clearance in exhaust and intake valves of a combustion engine such as is found in a motor vehicle and elsewhere. Another object is to provide a tool of this type which is easy to manipulate when gauges of different sizes are needed. Referring to the drawing, Fig. 1 is a side view of one embodiment of the invention, Fig. 2 is a top plan view of the device of Fig. 1, Fig. 3 is a section on the line 3—3 of Fig. 1, Fig. 4 is a plan view showing one of the clamping plates, Fig. 5 is a section through one of the housings which shows how the clamping plates are placed in position, Fig. 6 shows the device of this invention in use in an operator's hand.

The thickness or feeler gauges 10 and 11 are of slightly different size or thickness, such thickness depending on the clearance prescribed by the manufacturer for the intake and exhaust valves respectively. These gauges are secured within holders or housings 12 and 13 which are oppositely disposed and of generally U shape as illustrated in Fig. 3. The housing 12 in the embodiment illustrated is shown as being provided with guides or lateral flanges 14 shaped to receive cooperating outwardly flaring flanges or guides 15 formed on the opposite housing 13 so that relative sliding movement of one housing with respect to the other is made feasible. As shown in Figs. 1 and 2 at each end portion of each housing is formed a supporting shoulder 16 of a size sufficient to form supports for the enlarged heads 18 of the clamping plates 17.

Each housing is provided with a pair of such clamping plates 17 of the general shape illustrated in Fig. 4 and between these plates is held the thickness gauge or feeler strip. Each housing is provided with a clamp screw 19 engaging threads on the inturned portion 20 of the housing. The heads 21 and 22 of the screws 19 project oppositely so that these heads form convenient knobs for manipulation in opposite directions by an operator's thumb or finger, and so that one or the other of gauges 10 and 11 may be readily extended as shown in Fig. 6. To insert the clamping strips in place so that they may be positioned to bear against the supporting shoulder 16 with a gauge strip clamped between each pair of plates, it is necessary for the plates to be inserted longitudinally into the housing and arranged at an angle as shown in Fig. 5. Then by rotating the plates with a slight flexure of the sides of the housing outwardly as shown by the dotted lines 23 in Fig. 5 it will be possible to bring each pair of plates into a position in which they are substantially parallel to the base or roof of the housing with an adjacent enlarged end 18 contacting shoulders 16. The clamp screw 19 is then tightened to secure the gauge strip in position the consequent thrust being taken by shoulders 16, with the screws 19 projecting from the housing the desired amount. The head 21 for example is marked with an "L" 24 to indicate that the gauge strip 10 is a larger or thicker feeler strip and is therefore the one adapted for checking the clearance of the exhaust valves. The opposite head 22 is marked with an "S" to designate that the strip 11 is the smaller or thinner of the two strips and is therefore the one to be used for checking clearances of the intake valves.

In operation the feeler gauge holder is shown in Fig. 6 as being held in the hand of an operator with the strip 10 inserted between the valve stem 25 and the valve tappet 26 when the feel of the gauge strip upon insertion between these two parts enables the operator to know whether the clearance in the exhaust valve is of the right amount. The operator may check all of the exhaust valves so as to see that they possess the proper clearance and then proceed to check the intake valves or he may check an exhaust and then an intake valve as he proceeds along the line of valves. To move the gauge strip 11 from its retracted position to a forward position in which it extends ahead of the strip 10 it is only necessary for the operator to retract the housing 12 by moving his thumb rearwardly along it or move his fingers which are around the clamp screw head 22 forwardly, or both of these movements may be made until the strip 11 projects ahead of the strip 10 to a convenient amount for its intended use.

Although only two housings and two feeler strips have been illustrated, more than two such strips and housings may be used. One housing slides with respect to the other freely and enables the projection of one strip and retraction of the other to be easily and quickly made in the operator's hand as the valve clearances are checked. While the tool has been described in connection with its use as a feeler gauge in checking valve clearances in a combustion engine it will be understood the holder is adapted for other uses where more than one size of thickness gauge may be needed.

It will also be understood that both ends of the housings may be provided with clamping screws, and shorter lengths of gauges be employed so as to extend from opposite ends of the housings, thereby increasing the capacity of the tool as a gauge holder with the same sliding arrangement for selecting and extending the desired size from either end of the housings.

Among the advantages of this invention should be mentioned first the convenience of the tool for grasping in the operator's hand and its ease and facility in operation and in changing from one size gauge strip to the other by no more than the one hand operation of moving one strip forward and the other backward. The clamp screw heads serve as knobs against which the operator's fingers or thumb may rest to assist in facilitating forward movement or retraction of one housing with respect to the other.

What is claimed is:

1. A pair of oppositely disposed U-shaped housings having their ends shaped to engage and form a track along which one housing may slide with respect to the other, a feeler gauge strip secured in each housing between the sides thereof.

2. A combination according to claim 1 in which each gauge strip is clamped between a pair of stiff plates also located between and contiguous the sides of said housing.

3. A combination according to claim 1 in which each gauge strip is clamped between a pair of stiff plates also located between the sides of said housing, the sides of said housing being shaped to form supports for said plates, the contiguous plate having enlarged ends engaging said supports, and a clamp for pressing at least one of said stiff plates against said supports with the gauge strip between said plates.

4. A combination according to claim 1 in which each gauge strip is clamped between a pair of stiff plates also located between the sides of said housing, the sides of said housing being shaped to form supports for said plates, the contiguous plate having enlarged ends engaging said supports, and a clamp for pressing at least one of said stiff plates against said supports with the gauge strip between said plates, and the sides of each housing being laterally expansible to allow insertion and removal of said stiff plates from their supports, said plates being laterally of substantially the same width as the distance between said housing sides on the inside.

5. A pair of hollow housings slidable one on the other, a tool projecting longitudinally from each housing and secured therein, and a projection on each housing extending in a direction opposite to that in which the projection extends from the other housing, said housings being of a size for reception between the thumb and fingers of an operator's hand whereby the thumb and finger of one hand may effect a relatively sliding movement of said housings when they are retained in one hand.

6. A pair of relatively slidable housings, a support for a tool in each housing, said support being located on the opposite ends of each housing, clamping plates between which a feeler gauge is clamped, said plates extending longitudinally through each housing and mounted on said supports, and means for clamping said plates against said supports and gauge, said last mentioned means including a clamping screw extending out of each housing in a direction opposite to that in which the clamping screw extends from the other housing.

7. A holder for a thickness or feeler gauge comprising a pair of relatively slidable gauge strips and holders therefor having cooperating longitudinal guides for relative sliding movement between said holders along said guides, and clamping means on each holder for retaining one of said pair of gauge strips fixed therein so that the gauge strips project from adjacent ends of said holders in substantially parallel relationship, each of said clamping means projecting from said holder at right angles to the plane of the gauge strip.

FRED KOENIG.

REFERENCES CITED

The following references are of record in the file of this patent:

UNITED STATES PATENTS

| Number | Name | Date |
|---|---|---|
| 174,417 | Evans | Mar. 7, 1876 |
| 1,194,749 | Kirk | Aug. 15, 1916 |
| 1,696,019 | Sievern | Dec. 18, 1928 |
| 1,888,069 | Buck | Nov. 15, 1932 |